United States Patent [19]

Nakamura et al.

[11] Patent Number: 4,909,311

[45] Date of Patent: Mar. 20, 1990

[54] ENGINE COOLER

[75] Inventors: Ryuji Nakamura, Toyota; Hideki Nakayoshi, Kariya; Masato Itakura; Atsushi Satomoto, both of Toyota; Nobuyoshi Kozawa, Kariya; Shunzo Tsuchikawa, Ichinomiya, all of Japan

[73] Assignee: Aisin Seiki Kabushiki Kaisha, Kariya, Japan

[21] Appl. No.: 192,930

[22] Filed: May 12, 1988

[30] Foreign Application Priority Data

| May 15, 1987 | [JP] | Japan | 62-73224[U] |
| May 28, 1987 | [JP] | Japan | 62-81939[U] |
| May 29, 1987 | [JP] | Japan | 62-85278[U] |
| Sep. 24, 1987 | [JP] | Japan | 62-145646[U] |
| Sep. 28, 1987 | [JP] | Japan | 62-147757[U] |

[51] Int. Cl.$^4$ .................... F28F 13/12; F01P 7/10
[52] U.S. Cl. .................... 165/41; 165/44; 165/51; 165/125; 165/146; 165/151; 165/152; 123/41.49; 180/68.1
[58] Field of Search ............ 165/41, 44, 124, 125, 165/152, 153, 146, 51, 151; 123/41.49; 180/68.1

[56] References Cited

U.S. PATENT DOCUMENTS

| 2,184,837 | 12/1939 | Hemming | 165/124 |
| 2,368,392 | 1/1945 | Young | 165/125 |
| 2,646,027 | 7/1953 | Ackerman et al. | 165/51 |
| 3,347,310 | 10/1967 | Lind et al. | 165/124 |
| 3,420,294 | 1/1969 | Kirkpatrick | 165/41 |
| 3,774,710 | 11/1973 | Gustavsson | 165/51 |
| 3,868,992 | 3/1975 | Getz et al. | 165/51 |
| 3,978,919 | 9/1976 | Fachbach et al. | 165/125 |
| 4,062,401 | 12/1977 | Rudny et al. | 165/125 |
| 4,066,047 | 1/1978 | Vidakovic et al. | 165/125 |
| 4,120,271 | 10/1978 | Edmaier | 165/125 |
| 4,645,000 | 2/1987 | Scarselletta | 165/152 |

FOREIGN PATENT DOCUMENTS

| 0036213 | 9/1981 | European Pat. Off. | 165/125 |
| 1576705 | 5/1970 | Fed. Rep. of Germany . |
| 2442174 | 10/1975 | Fed. Rep. of Germany . |
| 2718966 | 11/1977 | Fed. Rep. of Germany . |
| 7712009 | 2/1980 | Fed. Rep. of Germany . |
| 921128 | 3/1963 | United Kingdom . |
| 2085764 | 5/1982 | United Kingdom | 165/125 |

Primary Examiner—John Ford
Attorney, Agent, or Firm—Oblon, Spivak, McClelland, Maier & Neustadt

[57] ABSTRACT

A cylindrically-shaped engine cooler for automobiles comprises a pair of water tanks or main coolant tubes, a plurality of water tubes connecting the water tanks or main coolant tubes, a plurality of cooling fins and at least one cooling fans. The cylindrical engine cooler is disposed in a vehicle so that the axis line of the cooler crosses the traveling line of a vehicle so that the air resistance against vehicle travel becomes small. The water tanks or main coolant tube can be used as the shroud for accommodating the cooling fan, when they are annularly shaped and disposed at the end of the cylindrically cooler. Two cooling fans disposed at the both ends of the cylindrically-shaped cooler may have different air-blowing capacity each other.

4 Claims, 6 Drawing Sheets

FIG.4
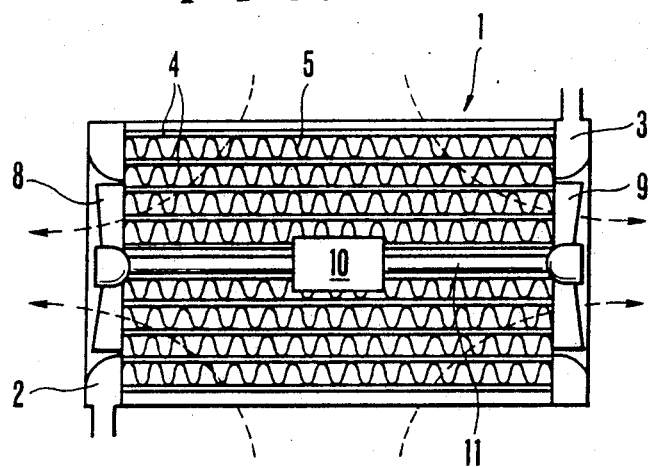
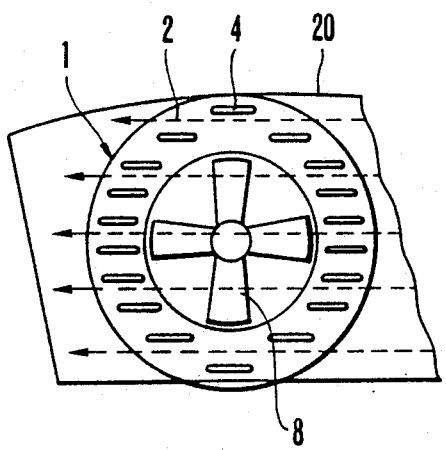
FIG.5

ENGINE COOLER

BACKGROUND OF THE INVENTION

1. Field of the Invention

This invention relates to an engine cooler to be used for cooling the engine of automobiles.

2. Prior Art

Conventional engine radiators for automobiles are described, for example, in Japanese Utility Model Publication No. 42181/1985 and in Utility Model Laid-open Publication No. 1918/1985. The device described in Utility Model Publication No. 42181/1985 is equipped with an upper tank 41 including an inlet pipe and a lower tank 42 including an outlet pipe as illustrated in FIG. 11, said both tanks 41 and 42 being connected with a plurality of water tubes 43, radiation fins being disposed between said tubes 43, and cooling fan 44 being installed facing the front of the vehicle. In the figure, numeral 45 represents the radiator and numeral 50 the engine. If this radiator 45 is mounted on an automobile as shown in FIG. 11, the shape of the body line of the automobile will be restricted by the height of the radiator 45 to be installed in the front of the engine 50, posing problems in reducing the CD value (coefficient of air resistance) and resulting in adverse effects to the vehicle performance, fuel costs and others.

The required heat radiating area of a radiator is determined in proportion to the amount of heat generated by the engine so that an attempt to decrease the height will result in increased size in the horizontal direction. This made it difficult to cool the engine effectively with a cooling fan.

To resolve this problem, it may be possible to dispose the radiator aslant the traveling direction of the vehicle or installing a plurality of radiators. In this case, however, it is difficult to effectively utilize the speed wind caused by the running vehicle. The reason is that with this arrangement, the shroud and cooling fan are installed in the direction of speed wind and they give resistance to the speed wind.

The device described in the aforementioned Utility Model Laid-open Publication No. 1918/1985 is a one in which radiator 171 and cooler condenser 172 are disposed facing the traveling direction of the vehicle and which comprises cooling fan 173 rotated with the drive force of engine 160 to blow cold air, shroud 174 to guide the cold air, and motor fan 175 to cool cooler condenser 172, as shown in FIG. 12.

In the aforementioned device, since the radiator 171 and cooler condenser 172 are installed in the longitudinal direction to blow cold air, the pressure rises between the radiator 171 and the cooler condenser 172 due to stagnant cold air, thereby causing back flow or spiral vortex of the cold air to deteriorate the cooling efficiency noticeably. Also the motor fan 175, cooling fan 173 and shroud 174 give resistance to the speed wind also when the vehicle is running, resulting in extremely deteriorated cooling efficiency due to the speed wind. Thus it has been a problem in that the capacity of the cooling fan 173 and radiator 171 had to be increased more than necessary.

To resolve the aforementioned problem, in the device shown in Provisional Utility Model Publication No. 155723 of 1985, a flutter is provided to the shroud to reduce the resistance of the speed wind due to the movement of the fan body, but it is difficult to eliminate the fan body and the reduction of resistance due to the movement of the flutter and fan is restricted by the structure of the shroud and the layout of the engine. Therefore, the cooling efficiency cannot be fully exhibited and the mechanism is complex and costly.

SUMMARY OF THE INVENTION

It is the object of this invention to obtain a compact engine cooler with high cooling efficiency.

In a first embodied mode of this invention, water tanks are disposed at the top and bottom of the radiator and are connected with a plurality of water tubes formed annularly between said both tanks, a plurality of corrugated fins being disposed between said water tubes, a shroud being provided on both sides or one side of left and right of the core comprising the aforementioned water tubes and aforementioned corrugated fins, and a cooling fan being provided, which is rotated by the driving gear installed in said shroud.

The aforementioned configuration, in which the upper and lower tanks are connected with annular water tubes, allows the heat radiating area to be increased by a factor of approximately three for the same height over the conventional radiator and reduced to approximately one-third for the same heat radiating area. Provision of the upper and lower tanks, which are connected with annular water tubes, and provision of corrugated fins between the water tubes allow the cooling performance to be improved. Also the resistance due to the speed wind can be reduced by installing the cooling fan(s) on both left and right sides or on one side, thereby allowing a compact radiator with high performance to be obtained.

In a second embodied mode of this invention, the radiator is provided with water tanks formed annularly on both left and right sides, said both tanks being connected with a plurality of water tubes, a plurality of corrugated fins being disposed between said water tubes, and a cooling fan is provided, which is disposed in the inner area of the aforementioned water tanks on both left and right sides and which is rotated by a driving gear.

The aforementioned configuration, in which the water tanks disposed on both left and right sides are formed annularly and both tanks are connected with a plurality of water tubes, allows the heat radiating area to be increased by a factor of approximately three over the conventional radiator for the same height and to be reduced to approximately one-third for the same heat radiating area, as in the aforementioned first embodiment. It is also possible to increase the heat radiating are and cooling efficiency and, consequently, to improve the cooling performance by disposing corrugated fins between the water tubes and making radiation fins thinner.

In a third embodied mode of this invention, an arc-shaped heat exchanger assembly is formed by combining and integrating a plurality of heat exchangers formed in an arc, wherein the inner area opens on both the left and right sides or on either one side of the axial direction, said heat exchanger assembly is installed in the left-and-right direction of the vehicle so that the center axis of said heat exchanger assembly is perpendicular to the traveling direction of the vehicle, and a cooling fan is provided, which is installed in the inner area which opens on both left and right sides or either one side of the aforementioned axial direction and which is rotated by a prime mover.

The aforementioned configuration, which forms heat exchangers such as the cooler condenser, radiator, etc. in a cylindrical heat exchanger assembly, allows reduction of size, and the provision of a cooling fan in the inner area which opens on both left and right sides or on either side of the axial direction permits the cold air to flow toward the outside of the vehicle through the opened inner area as a shroud and cooling to be effected effectively.

Since the cooling fan and shroud do not give resistance to the speed wind when the vehicle is running, an engine cooler with high cooling efficiency can be provided. Furthermore, the resistance due to the speed wind can be reduced and the cooling efficiency can be improved greatly over the conventional device by installing the heat exchanger assembly in the right-and-left direction of the vehicle so that its center axis is perpendicular to the traveling direction of the vehicle and by providing the cooling fan in the inner area on both left and right sides or either one side of the axial direction.

In a fourth embodied mode of this invention, the amount of air of the cooling fan installed in the inner area of the heat exchanger assembly and located at the outlet of coolant is controlled to be smaller than the amount of air of the cooling fan located at the inlet of the coolant, and to decrease the amount of the air of the cooling fan at the outlet of the coolant, the diameter of said fan is designed to be smaller than the diameter of the fan at the inlet or coolant or the rotational speed of the cooling fan at the outlet of coolant is designed to be smaller than the rotational speed of the cooling fan at the inlet of coolant.

With the aforementioned configuration, the amount of air of the cooling fan at the outlet of coolant becomes smaller than the amount of air of the cooling fan at the inlet of coolant and the amount of air corresponding to the temperature at the outlet of coolant does not exceed the required level, assuring an appropriate amount of air blown.

In a fifth embodied mode of this invention, the radiation fins installed between the tubes of the heat exchanger assembly are installed with smaller clearance to the adjacent radiation fins in the neighborhood where the cooling fan is located but with uneven clearance at the center.

With this configuration, if the cooling fan operates, cold air flows from the center of the heat exchanger assembly toward the outside, passing by the cooling fan. Here, the cold air is utilized effectively by the radiation fins installed densely between the tubes in the neighborhood of the cooling fan to which the cold air is concentrated, thereby improved cooling efficiency being obtainable.

The foregoing and other objects, features and advantages of the present invention will be understood more clearly and fully from the following detailed description of preferred embodiments with reference to the attached drawings.

BRIEF DESCRIPTION OF THE DRAWINGS

FIG. 4 is the front view of a second embodiment of the radiator unit according to this invention.

FIG. 5 is the side view of the radiator unit shown in FIG. 4.

DETAILED DESCRIPTION OF THE PREFERRED EMBODIMENTS

Embodiments of this invention are described below referring to drawings.

Figure 1:
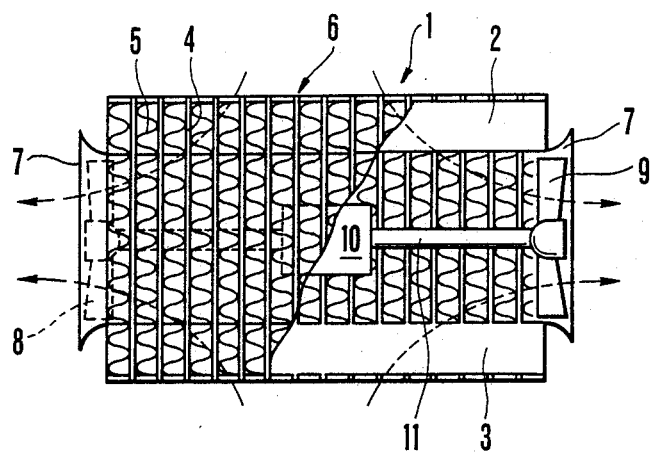
FIG. 1 is the front view of one embodiment of the radiator unit according to this invention.
Figure 2:
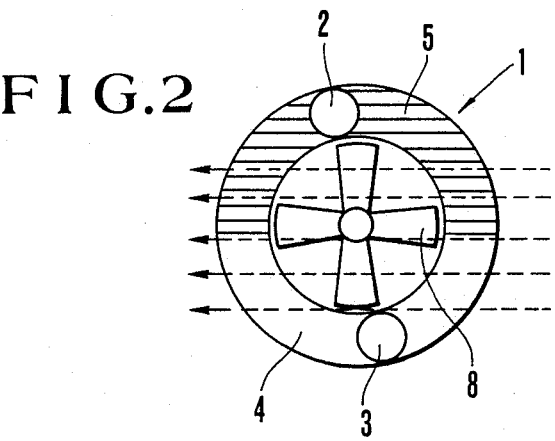
FIG. 2 is the side view of the radiator unit shown in FIG. 1.

In FIG. 1 and FIG. 2, the radiator unit 1 has upper and lower tanks 2 and 3, and both tanks 2 and 3 are connected with a plurality of water tubes 4 formed annularly. A plurality of corrugated fins 5 are disposed between tubes 4 and 4 and the cylindrical core 6 is formed with the aforementioned annular tube 4 and corrugated fin 5. The shroud 7 and cooling fans 8 and 9 are disposed on both left and right sides of the core 6 and the cooling fans 8 and 9 are rotated by the driving gear 10 through the same drive shaft 11 and blows air toward the outside. The aforementioned cooling fans 8 and 9 can be provided only on one side of left or right depending on the amount of air required. The driving gear uses an electric motor, a hydraulic motor or other means and is housed in the core 6. With this configuration, if the water temperature rises when the vehicle is stopped (during idling), cooling fans 8 and 9 are rotated by the driving gear 10 through the drive shaft 11 and blow air toward the outside as shown by the dotted-line arrow in FIG. 1 to deprive the corrugated fin 5 of heat. When the vehicle is running, the speed wind flows as shown by the dotted-line arrow in FIG. 2 and deprives the corrugated fin 5 of heat. Here, what causes resistance to the speed wind are only the driving gear 10 and the drive shaft 11 and the resistance becomes smaller than with the conventional device.

Figure 3:
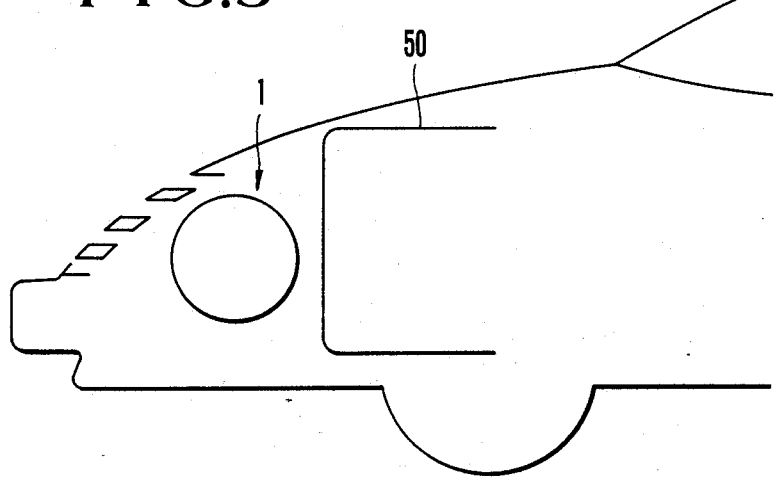
FIG. 3 is the side view of the radiator unit according to this invention when mounted on an automobile.

FIG. 3 shows the radiator 1 of this invention mounted in a vehicle, which allows the body line of the vehicle to be designed lower along the shape of the radiator unit 1 and the coefficient of air resistance of the vehicle to be greatly reduced as compared to the prior art. Incidentally, numeral 50 in the figure represents the engine.

Unlike the device shown in FIG. 1, the radiator unit shown in FIG. 4 and FIG. 5 have water tanks 2 and 3 formed annularly on the left and right ends.

Both tanks 2 and 3 are connected with a plurality of water tubes 4, and a plurality of corrugated fins 5 are disposed between the water tubes 4 and 4. Cooling fans 8 and 9 are rotated by the driving gear 10 through the same drive shaft 11 and blow air toward the outside through the inner areas of water tanks 2 and 3 respectively. The aforementioned cooling fans 8 and 9 may be provided only on one the left and right sides depending on the amount of air required. The aforementioned driving gear uses an electric motor, a hydraulic motor or other means and is housed in the core comprising water tubes 4 and corrugated fins 5.

With this configuration, if the water temperature rises when the vehicle is stopped (during idling), cooling fans 8 and 9 are rotated by the driving gear 10 through the drive shaft 11 and cause air to flow toward the outside as shown by the dotted-line arrow while depriving the corrugated fins of heat. When the automobile is running, the speed wind flows as shown by the dotted-line arrow in FIG. 5 and deprives the corrugated fins 5 of heat. Here, what causes resistance to the speed wind are only the driving gear 10 and drive shaft 11 and the resistance is greatly reduced as compared to that of the conventional system.

It is also possible to further improve the cooling efficiency of the radiator unit 1 by providing a duct 20 in the vehicle body as shown in FIG. 5 and accommodating the radiator unit 1 in this duct 20.

Figure 6:
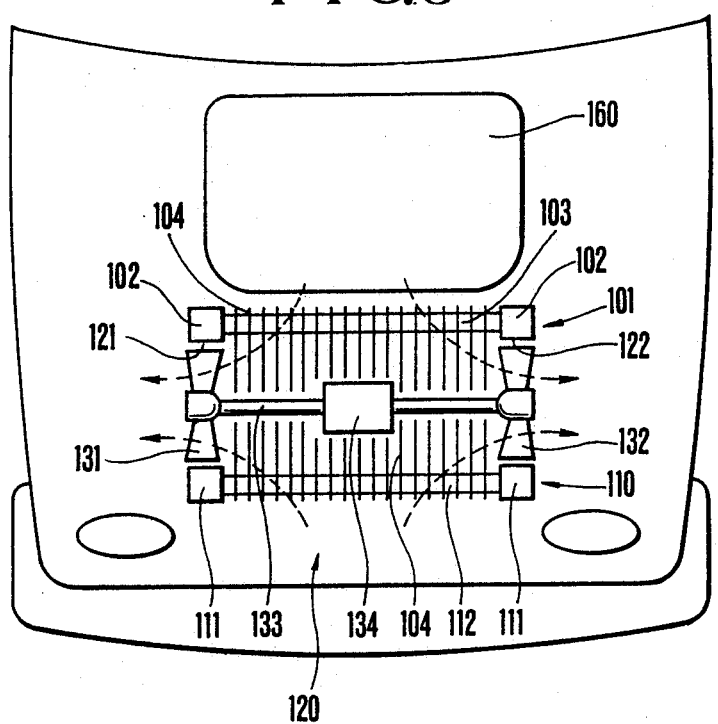
FIG. 6 is the plan view of a third embodiment of the radiator unit mounted on an automobile according to this invention.
Figure 7:
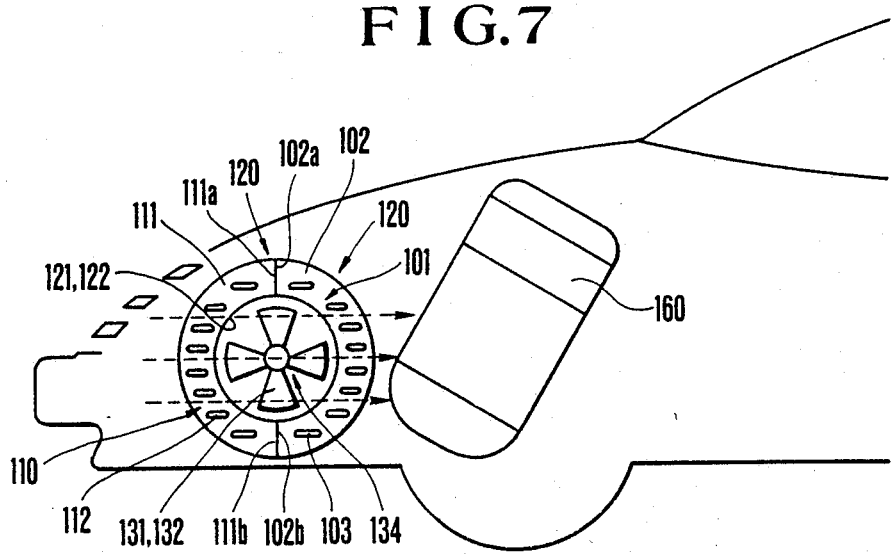
FIG. 7 is the side view of the radiator unit shown in FIG. 6.
Figure 8:
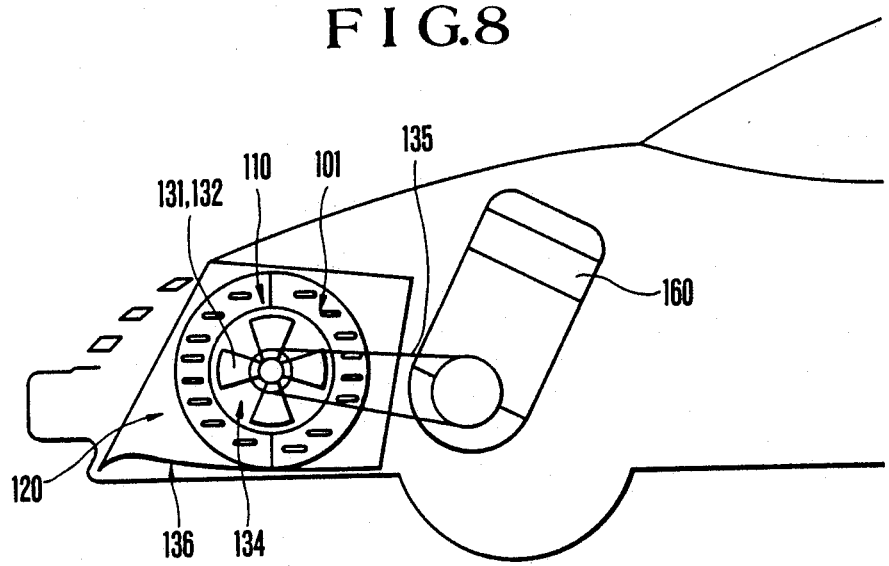
FIG. 8 is a side view of the radiator unit mounted on an automobile shown in FIG. 6 in which the drive method is changed.

In the devices shown in FIG. 6 through FIG. 8, the cooler condenser 101 comprises left and right headers 102 and 102 formed in an arc, a plurality of cooler condenser tubes 103 connecting the left and right headers 102 and 102, and a plurality of radiation fins 104 secured to each cooler condenser tube 103 by welding.

The radiator 110, like the aforementioned cooler condenser 101, comprises the left and right headers 111 and 111 formed in an arc, a plurality of radiator tubes 112 connecting the left and right headers 111 and 111, and a plurality of radiation fins 104 secured to each radiator tube 112 by welding.

The arc-shaped heat exchanger assembly 120 is formed by joining both end surfaces 102a and 102b of the left and right headers 102 and 102 and both end surfaces 111a and 111b of the left and right headers 111 and 111 by welding or by connecting them with bolts or the like to integrate them, and the inner areas 121 and 122 which open to the left and right sides of the axial direction are used as a shroud. This heat exchanger assembly 120 is installed in the left-and-right direction of the vehicle so that the center axis is at right angles to the traveling direction of the vehicle.

Cooling fans 131 and 132 are installed in the inner areas 121 and 122 on the left and right sides of the aforementioned heat exchanger assembly 120 and are rotated by the prime mover 134 through the same drive shaft 133. The prime mover 134 uses an electric motor, hydraulic motor or one which is driven by the engine 160 using the belt 135. The aforementioned cooling fans 131 and 132 are driven by the same drive shaft 133 for the prime mover 134, but a plurality of prime movers 134 corresponding to respective fans 131 and 132 may be provided to control the amount of cold air as required or the cooling fan 131 or 132 may be provided only on one side of left and right to close the other side of the shrouds 121 and 122.

With this configuration, cooling fans 131 and 132 are driven by the prime mover 134 when the vehicle is stopped (during idling) and the cold air flows through shrouds 121 and 122 as shown by the dotted-line arrow in FIG. 1 to cool the cooler condenser 101 and radiator 110.

When the vehicle is running, the speed wind flows as shown by the dotted-line arrow in FIG. 7 to cool the cooler condenser 101 and radiator 110. Here, resistance to speed wind is caused only by the prime mover 134 and drive shaft 133 and the resistance can be greatly reduced as compared to the prior art. Incidentally, numeral 136 in FIG. 8 represents a cold air guide plate and 160 the engine and it goes without saying that the cooling efficiency can be improved further by smoothly introducing the cold air using the cold air guide plate 136.

Figure 9:
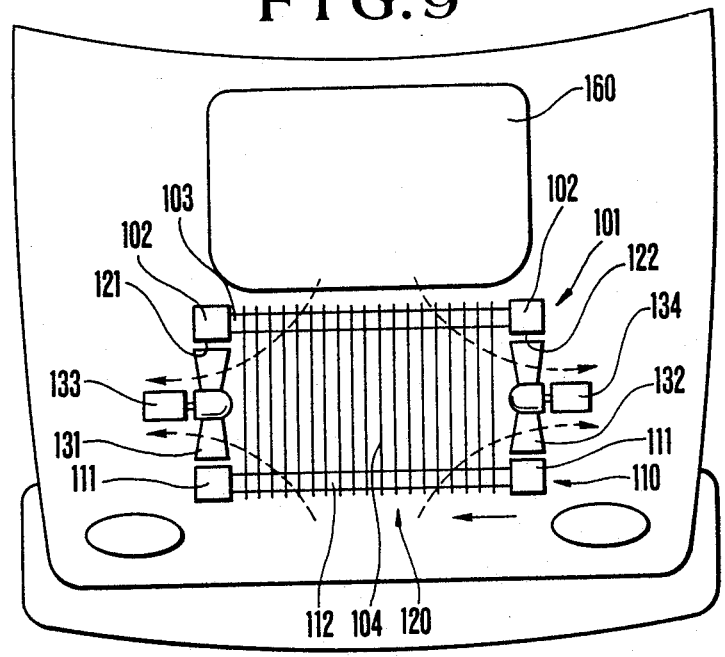
FIG. 9 is the plan view of a fourth embodiment of the radiator unit mounted in an automobile according to this invention.

In the device shown in FIG. 9, the cooling fans 131 and 132 are installed in the inner areas 121 and 122 on both left and right sides of the aforementioned heat exchanger assembly 120 and are directly connected to the drive shaft 133 and prime mover 134 respectively. Since the temperature of the coolant flowing in the heat exchanger assembly 120 differs between the coolant inlet side and the coolant outlet side, these cooling fins 131 and 132 are designed to make the amount of air for the cooling fan 131 installed on the coolant outlet side smaller than the amount of air for the cooling fan 132 installed on the coolant inlet side and the diameter of the cooling fan 131 on the coolant outlet side is smaller than the diameter of the cooling fan 132 on the coolant inlet side. Also the amount of air for the cooling fan 131 can instead be made smaller than the amount of air for the cooling fan 132 by making the rotational speed of the cooling fan 131 on the coolant outlet side lower than the rotational speed of the cooling fan 132 on the coolant inlet side.

With this configuration, the cooling fans 131 and 132 are driven by the drive shaft 133 and prime mover 134 respectively when the vehicle is stopped (during idling) and cold air flows through shrouds 121 and 122 as shown by the dotted-line arrow in FIG. 1 to cool the heat exchanger assembly 120 comprising the cooler condenser 101 and radiator 110. Here, the amount of air for the cooling fan 131 is smaller than the amount of air for the cooling fan 132 as mentioned earlier and an optimum amount of air is blown without exceeding the required level.

Figure 10:
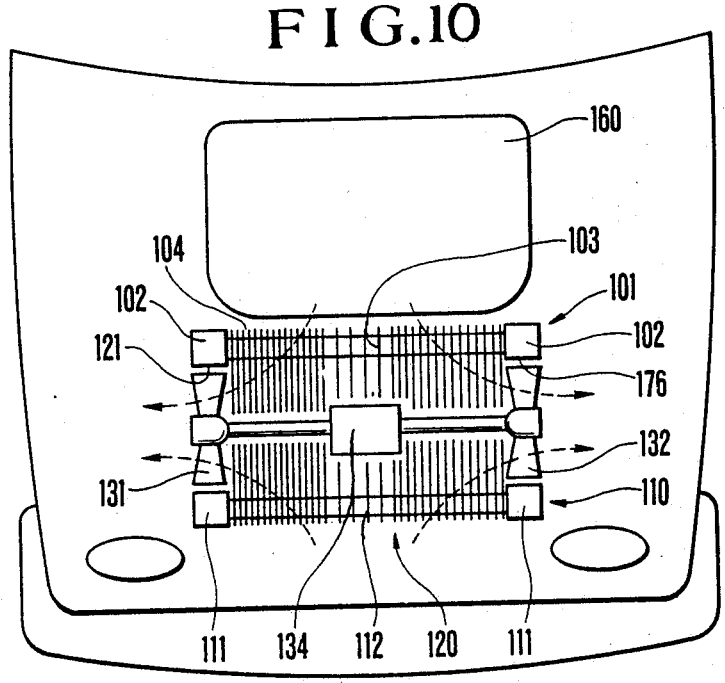
FIG. 10 is the side view of a fifth embodiment of the radiator unit mounted in an automobile according to this invention.
Figure 11:
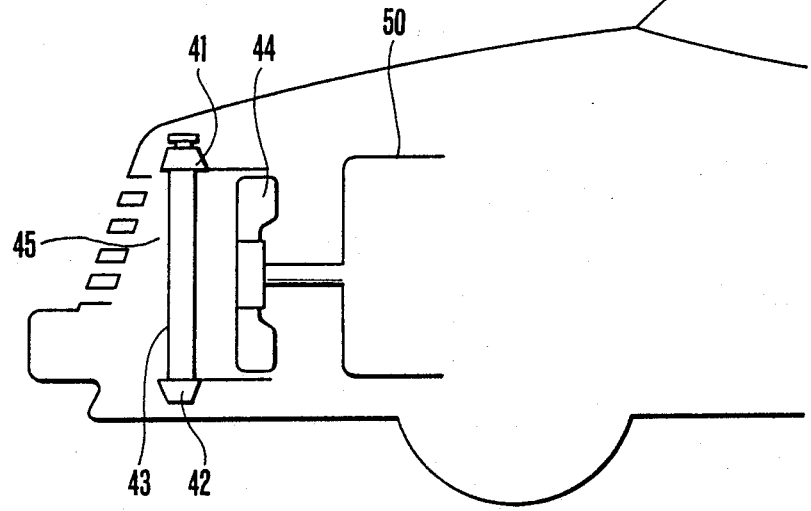
FIG. 11 is the side view of an embodiment of the conventional radiator unit mounted in an automobile.
Figure 12:
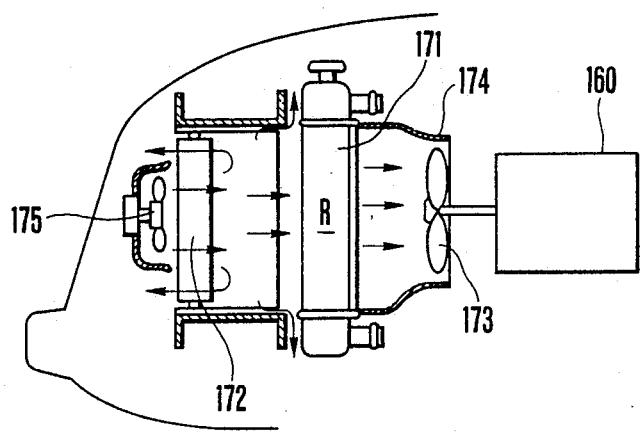
FIG. 12 is the side view of another embodiment of the conventional radiator unit as mounted in an automobile.

In the device shown in FIG. 10, radiation fins 104 are disposed with smaller clearances between radiation fins 104 in the neighborhood of cooling fans 131 and 132 which are installed in the inner areas 176 and 176 of the heat exchanger assembly 120, but with larger clearance at the middle. This arrangement of radiation fins 104 is intended to effectively cool the cold air in the neighborhood of the cooling fans 131 and 132.

The cylinder heat exchanger assembly 120 is formed by joining both end surfaces of headers 102 and 102 of the cooler condenser 101 and both end surfaces of headers 111 and 111 of the radiator 110 by welding or by integrating them using bolts or the like; thereby the inner areas 176 and 176 which open to both left and right ends in the axial direction are used as shroud. This heat exchanger assembly 120 is installed in the left-and-right direction of the vehicle so that the center axis is perpendicular to the traveling direction of the vehicle and is located in the front of the engine 160. Cooling fans 131 and 132 are installed in the inner areas 176 and 176 on both left and right sides of the aforementioned heat exchanger assembly 120 and are rotated by the prime mover 134 through the same drive shaft 133.

With the aforementioned configuration, cooling fins 131 and 132 are driven by the prime mover 134 when the vehicle is stopped (during idling) and cold air flows through the shrouds 176 and 176 as shown by the dotted-line arrow in FIG. 1 to cool the condenser cooler 102 and radiator 110. Here, the cold air is effectively cooled with the radiation fins 104 installed densely in the neighborhood of the cooling fans 131 and 132.

It should be understood that, although the preferred embodiment of the present invention has been described herein in considerable detail, certain modifications, changes, and adaptations may be made by those skilled in the art and that it is hereby intended to cover all modifications, changes and adaptations thereof falling within the scope of the appended claims.

What is claimed is:

1. An engine cooler in a vehicle, comprising:
   a plurality of substantially parallel annular water tubes having coincident axes extending perpendicular thereto, and being mutually spaced along their respective axes;
   two vertically spaced water tanks, each of said water tanks connected to at least some of said water tubes;
   a plurality of corrugated cooling fins, wherein said water tubes, water tanks and cooling fins together comprise a cylindrically shaped radiator unit having an axis substantially parallel to the axes of said water tubes, the radiator unit being disposed in the vehicle so that the radiator unit axis crosses the longitudinal axis of the vehicle, and wherein substantially all of said cooling fins are disposed between said water tubes so as to define openings substantially parallel to the longitudinal axis of the vehicle, thereby permitting air flow therepast along said axis of the vehicle;
   a shroud disposed on at least one end of said cylindrically shaped radiator unit; and
   a driven cooling fan disposed in said shroud.

2. An engine cooler in a vehicle, comprising:
   a plurality of linear water tubes arranged so as to comprise a cylindrical shape; annularly shaped water tanks connected to opposite ends of said plurality of water tubes;
   a plurality of corrugated cooling fins, wherein said water tubes, water tanks and cooling fins together comprise a cylindrically shaped radiator unit disposed in the vehicle so that an axis of said cylindrical radiator unit crosses the longitudinal axis of the vehicle, and wherein substantially all of said cooling fins are disposed between said water tubes so as to define openings substantially parallel to the longitudinal axis of the vehicle, thereby permitting air flow therepast along said axis of the vehicle; and
   at least one driven cooling fan disposed in a circular area surrounded by one of said water tanks.

3. An engine cooler in a vehicle, comprising:
   a plurality of linear water tubes arranged so as to comprise a cylindrical shape;
   annularly shaped water tanks connected to opposite ends of said plurality of water tubes, each of said water tanks being comprised by a plurality of arcuate water tank units;
   a plurality of cooling fins, wherein said water tubes, water tanks and cooling fins together comprise a cylindrically shaped radiator unit disposed in the vehicle so that an axis of said cylindrical radiator unit crosses the longitudinal axis of the vehicle, and wherein said cooling fins are disposed on said water tubes perpendicularly thereto and substantially parallel to the longitudinal axis and perpendicularly to the axis of the cylindrically shaped radiator so as to permit air flow therepast along the longitudinal axis of the vehicle; and
   a pair of driven cooling fans, each of said cooling fans being disposed respectively in a shroudlike area at an axial end of said radiator unit, wherein a first cooling fan is disposed at a coolant-inlet end and a second cooling fan is disposed at a coolant-outlet end, said second cooling fan having an air blowing capacity less than that of said first cooling fan.

4. An engine cooler in a vehicle, comprising:
   a plurality of linear water tubes arranged so as to comprise a cylindrical shape; annularly shaped water tanks connected to opposite ends of said plurality of water tubes, each of said water tanks being comprised by a plurality of arcuate water tank units;
   a plurality of cooling fins, wherein said water tubes, water tanks and cooling fins together comprise a cylindrically shaped radiator unit disposed in the vehicle so that an axis of said cylindrical radiator unit crosses the longitudinal axis of the vehicle, and wherein said cooling fins are disposed on said water tubes perpendicularly thereto and substantially parallel to the longitudinal axis and perpendicularly to the axis of the cylindrically shaped radiator so as to permit air flow therepast along the longitudinal axis of the vehicle;
   a pair of driven cooling fans, each of said cooling fans being disposed respectively in a shroudlike area at an axial end of said radiator unit; and
   said cooling fins being mutually disposed with uneven clearance, wherein said clearances in a zone adjacent to each of the cooling fans are smaller than said clearances in a zone spaced from the cooling fans whereby effective cooling is achieved.

* * * * *